United States Patent [19]

Berkowitz

[11] Patent Number: 4,893,840

[45] Date of Patent: Jan. 16, 1990

[54] ARTICLE IDENTIFICATION LABEL AND METHOD OF ARTICLE IDENTIFICATION

[76] Inventor: William E. Berkowitz, 4931 Birchwood, Skokie, Ill. 60077

[21] Appl. No.: 181,941

[22] Filed: Apr. 15, 1988

[51] Int. Cl.⁴ .................. B42D 15/00; G09F 3/00; G02C 1/00; B05D 3/06

[52] U.S. Cl. .................................. 283/81; 283/74; 351/158; 427/54.1

[58] Field of Search .............. 283/72, 74, 81; 281/2; 427/7, 53.1, 54.1, 157, 197, 292, 385.5, 388.1; 351/41, 51, 158; 206/5; 29/20

[56] References Cited

U.S. PATENT DOCUMENTS

| | | |
|---|---|---|
| 1,076,770 | 10/1913 | Kithil . |
| 1,538,388 | 5/1925 | Dostal . |
| 1,638,795 | 8/1927 | Bentley . |
| 1,797,998 | 3/1931 | Sadtler . |
| 2,143,141 | 1/1939 | Cooley ............................ 41/21 |
| 2,721,498 | 10/1955 | Gerson .......................... 351/158 |
| 2,842,028 | 7/1958 | Belgard ........................... 351/51 |
| 2,981,022 | 4/1961 | Anger ............................. 41/30 |
| 3,616,005 | 10/1971 | Wetstone ...................... 156/183 |
| 3,641,319 | 2/1972 | McGuire ........................... 281/2 |
| 3,849,226 | 11/1974 | Butz .............................. 156/24 |
| 3,864,855 | 2/1975 | Pekko ............................ 40/2 R |
| 4,400,423 | 8/1983 | Scher et al. ................... 427/197 |
| 4,589,685 | 5/1986 | Lazar ............................. 283/81 |
| 4,606,927 | 8/1986 | Jones ............................. 427/7 |
| 4,645,239 | 2/1987 | Adams ............................ 283/81 |
| 4,665,598 | 5/1987 | Murai et al. ..................... 29/20 |
| 4,690,837 | 9/1987 | Doroszkowski et al. ...... 427/385.5 |
| 4,714,655 | 12/1987 | Bordoloi et al. .............. 427/54.1 |
| 4,730,849 | 3/1988 | Siegel ............................ 283/81 |
| 4,748,046 | 5/1988 | Kuboki et al. ................ 427/54.1 |

FOREIGN PATENT DOCUMENTS 113914  7/1983  Japan .................................... 351/51

OTHER PUBLICATIONS

"I-Dents" Advertisement (Apr. 1987).
"Hermes Engraving Machines and Accessories" Product Catalog (bearing a 1986 copyright notice).

*Primary Examiner*—Frank T. Yost
*Assistant Examiner*—Paul M. Heyrana, Sr.
*Attorney, Agent, or Firm*—McDermott, Will & Emery

[57] ABSTRACT

An article identification label and method of article identification is disclosed for labelling portable articles used by humans. The label includes a tag affixed to a surface of the article and containing identifying indicia visible to the naked eye. A transparent coating which is adapted to withstand wear from frequent and prolonged usage of the article substantially covers the tag. The coating may be formed when a hardenable liquid, such as a light-curing adhesive, is applied to the tag and allowed to cure or harden.

5 Claims, 4 Drawing Sheets

ARTICLE IDENTIFICATION LABEL AND METHOD OF ARTICLE IDENTIFICATION

FIELD OF THE INVENTION

This invention relates generally to article identifiers and methods of article identification, and is particularly directed to an identification label and method for portable articles that are worn or used by humans.

BACKGROUND OF THE INVENTION

It is not uncommon for persons to lose or misplace portable articles that are worn or used regularly, such as eyeglasses, items of jewelry, sporting equipment, clothing, toys, tools, and the like. For example, a person wearing a pair of eyeglasses may temporarily remove them, intending to pick them up later but forgetting and leaving them behind. Loss of such an article can cause considerable inconvenience to the wearer, who must have the item replaced, often at considerable expense. This problem is particularly acute in the case of eyeglasses, which, because they are often removed, are easily lost or misplaced. Loss of a pair of eyeglasses causes particular inconvenience, since the owner may be left without any eyeglasses while the lost pair is being replaced.

Methods of identification for such frequently-used articles are known, but have not been widely used. For example, for a number of years it has been known to engrave such articles with identifying indicia. In this method, an engraving machine is used to etch a surface of the article. Engraving suffers from a number of drawbacks, however. First, there is a limit on how small the etched indicia can be made. This, in turn, makes the etching method difficult and impractical for extremely small or narrow objects and objects which may vary in size, such as small items of jewelry and eyeglass temples. Second, the machines used for engraving are costly. Independent distributors of jewelry and eyeglasses are usually unable to afford machines of this type. Third, engraving leaves an impression in the surface of the article to be identified. Because articles such as eyeglasses and jewelry come into frequent contact with human skin, the engraved impressions can trap dirt and bacteria, giving such articles an unsightly appearance and creating an undesirable and unhygienic condition.

Other methods of article identification are known, but are not suitable for use with portable articles that are used frequently. For example, U.S. Pat. No. 4,606,927 to Jones discloses a minute, color-coded identifier that is dispersed in a transparent and hardenable cementitious liquid. The liquid is applied to the article to be labelled in sufficient quantities so that one or more of the identifiers becomes attached to the article. The identifier can then be read with a magnifying device. Of course, such a method is impractical for use with portable articles that are easily lost. A person finding an article labelled in this fashion would not be alerted to the presence of the label and, even if he were, he would be unable to decipher the color-coding identification system so hat the article could be returned to its rightful owner.

Because of these and other drawbacks, the above methods of article identification have not been consistently used to label portable articles that are used frequently, such as eyeglasses, jewelry, sporting equipment, toys, tools, and the like. As a result, there currently exists a need for a label for such articles, one that is readily visible to a finder of the article but which is substantially impervious to wear and which does not trap dirt and bacteria. There is also a need for a practical and economical system of identification for such articles, so that sellers of such articles can easily and consistently apply owner-identifying labels to such articles at the time they ar sold. This need is particularly acute in the case of eyeglasses, which are easily lost or misplaced. A system of identification for such articles would be of great benefit, both to the sellers of such articles and to the persons who wear them.

SUMMARY OF THE INVENTION

The present invention provides an article identification label and method of article identification designed to satisfy the aforementioned needs. The identification label of the present invention comprises identifier means mounted on a surface of the article. The identifier means are visible to the naked eye and may consist of the telephone number of the seller of the article and a mark identifying the person or entity to which the article is sold. A transparent coating means substantially covers the identifier means and is adapted to withstand wear from frequent and prolonged usage of the article by humans.

In a preferred form of the present invention, the transparent coating means is formed when a hardenable liquid is applied to a tag which contains identifying indicia and allowed to harden. The preferred hardenable liquid is a light-curing adhesive which has been allowed to harden by exposure to light falling within a specified wavelenth range and intensity. The resulting coating is capable of withstanding wear from usage of the article.

The present invention also provides a method of article identification for such portable articles. The method includes the steps of imprinting label means with identifying indicia visible to the naked eye, mounting the label means on a surface of the article to be labelled, and substantially covering the label means with a trasparent coating means adapted to withstand wear from frequent and prolonged usage of the article. In a preferred form of this method, the transparent coating means is formed when a light-curing adhesive is applied to a tag containing identifying indicia and allowed to harden by exposure to light falling within a specified wavelength range and intensity.

The present invention provides an inexpensive means of labelling portable articles that are frequently used and lost. The materials and equipment used to make the labels and carry out the method of the present invention are far more affordable than the conventional etching equipment. The method does not require that impressions be made in the surface of the article. The label is resistant to wear from even prolonged usage of the article. Finally, a label made in accordance with the present invention is visually apparent to the finder of the article. Thus, a finder of the article can take steps to return it to its rightful owner.

The foregoing features and advantages of the present invention will be more readily understood upon consideration of the following detailed description, taken in conjunction with the accompanying drawings, in which:

DETAILED DESCRIPTION

Figure 1:
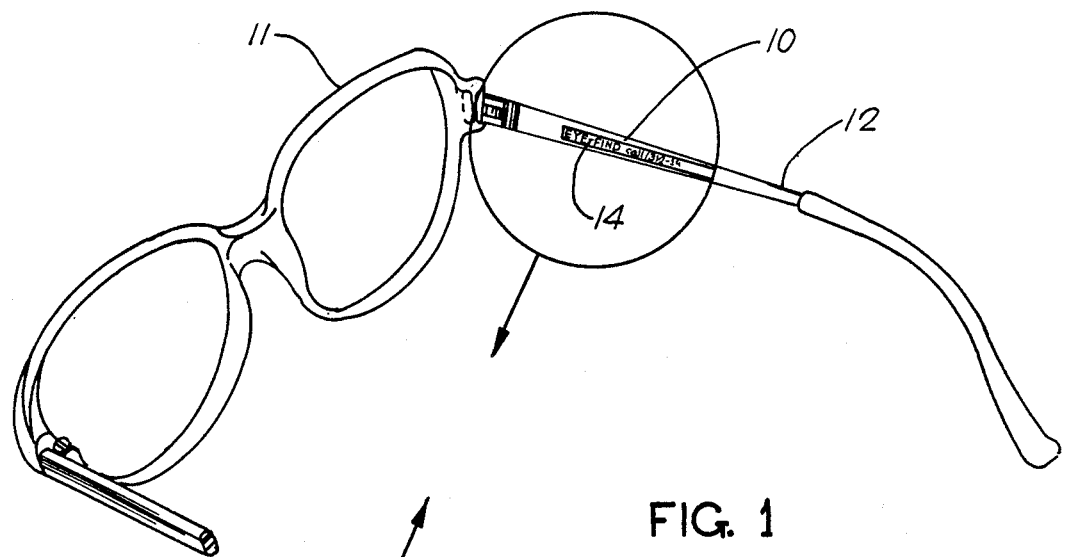
FIG. 1 is a perspective view of the identification label of the present invention as it has been applied to the temple of a pair of eyeglasses.
Figure 3:
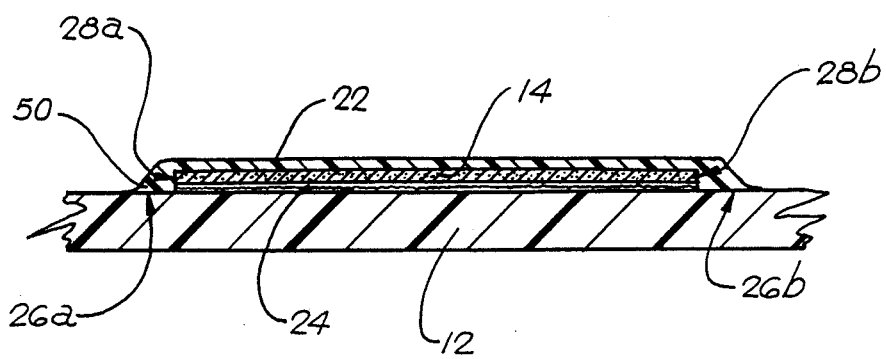
FIG. 3 is an enlarged sectional view of the label of the present invention, as applied to the surface of an article.

FIG. 1 shows an article identification label (indicated generally by the reference numeral 10) of the type used in practicing the present invention. The label 10 includes an identifier means in the form of a tag 14 mounted on the surface of an article to be identified, which, in FIG. 1, is a pair of eyeglasses 11. The identifier means is visible to the naked eye. As best seen in FIG. 3, the label 10 also includes a transparent coating means in the form of a coating 22, which substantially covers the identifier means and is adapted to withstand wear from frequent and prolonged usage of the article by humans.

In FIG. 1, the label 10 is shown as having been applied to the surface of a temple piece 12 of a pair of eyeglasses 11. However, it will be understood that the label 10 may be applied to many other types of articles worn or used by humans, in particular, portable articles, such as items of jewelry (including rings, watches, bracelets, brooches, and necklaces), sporting goods (including golf clubs, baseball bats, protector helmets, ice skates, roller skates, skateboards, bicycles, hockey equipment, scuba gear, parachute gear, fishing rods, tackle boxes, model airplanes, and boats), clothing, cameras and camera equipment, and umbrellas. For example, the label 10 can be applied to the inner circumferential surface of a ring or bracelet or to a surface of a golf club. It will also be understood that the articles to which the label is applied may be made of a wide range of materials, including metal alloys, plastics (including molded polypropylene), and the like.

Figure 2:
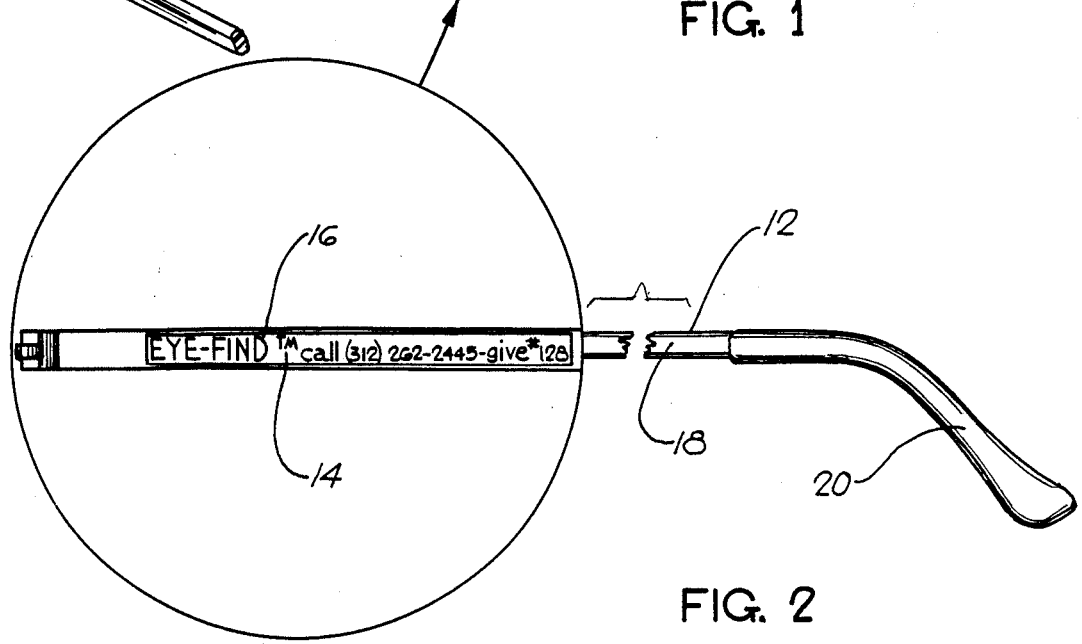
FIG. 2 is an enlarged front view of the temple portion of the eyeglasses depicted in FIG. 1.

As best seen in FIG. 2, in which the encircled area represents the same area as the encircled area shown in FIG. 1, in its preferred form the label 10 includes an identifier means in the form of a tag 14. Preferably, the tag 14 is substantially rectangular in shape and substantially flat. However, the tag 14 may also be made in other shapes and sizes. The tag 14 may be made of a wide range of materials, including paper or other materials used in the printing trade. Preferably, however, the tag 14 is made of a flexible plastic material. In particular, successful results have been achieved using tags 14 made of flexible polyester, which is sold by DuPont under the brand name MYLAR ®. The tag 14 contains identifying indicia (indicated generally by the reference number 16). In the embodiment depicted in FIG. 2, the identifying indicia 16 are printed on the tag 14 and consist of the telephone number of the person, company, or entity selling the eyeglasses, together with a numeral identifying the particular person or entity to whom the eyeglasses are sold. In this way, someone finding the eyeglasses may call the telephone number on the tag 14 and give the identifying numeral provided, and arrangements may be made for return of the article to its rightful owner. In addition, however, the identifying indicia 16 may consist of any indicia which can permit the article to be returned to its rightful owner. For example, the identifying indicia 16 may be "customized" with the name and telephone number of the owner of the article. The identifying indicia may also consist of the telephone number of a central clearing house and a customer identification code, so that the finder of the article may call the central clearing house, which maintains a list of the customer identification codes and the corresponding customers. Finally, the identifying indicia may consist simply of the name and telephone number of the seller of the article, so that the label may serve as an advertisement for the seller.

The identifying indicia 16 are visible to the naked eye, i.e., they may be viewed without magnification. In addition, the identifying indicia 16 are not encoded and can be readily understood by the finder of the article.

In FIG. 2, the tag 14 is shown as being mounted on the surface of the temple piece 12 of a pair of eyeglasses. The particular temple piece 12 shown in FIG. 2 consists of two parts: a temple insert 18, which is made of a metal alloy, and an ear portion 20, which is made of plastic. It will be understood, however, that the temple piece 12 may be a single, integral piece of metal or plastic.

As best seen in FIG. 3, the tag 14 may be affixed to the surface of the temple piece 12 with an adhesive 24. This adhesive 24 may be any number of water- or solvent-based adhesives. It may also be a contact, or pressure-sensitive, adhesive. However, it is important that the adhesive be compatible with the substance used to create the identifying indicia (not shown) found on the tag 14. In other words, the adhesive 24 should not dissolve or render illegible the identifying indicia. It will be understood that the coating 22 is also responsible for affixing the tag 14 to the surface of the article.

The label 10 also consists of a coating 22, which substantially covers the tag 14, i.e., substantially encapsulates the portions of the tag 14 which are not engaging the article. The coating 22 is transparent, i.e., the identifying indicia (not shown in FIG. 3) are visible through the coating 22. However, it will be understood that the coating 22 may be pigmented or colored, so long as the identifying indicia are visible therethrough. Preferably, the coating 22 also overlaps onto adjacent surface portions of the article being covered—in FIG. 3, the portions 26a, 26b of the temple 12 adjacent to the tag 14— so that the edges 28a, 28b of the tag 14 are also substantially covered with the coating 22. In this fashion, a substantially continuous bead 50 of the coating 22 surrounds the edges of the tag 14. It will be understood that the tag 14 of FIG. 3, which is rectangular, also has two additional edges (not shown) which are also substantially covered with the coating 22. When the coating 22 overlaps the surface of the article being covered in this fashion, the label 10 is less likely to be intentionally or inadvertently peeled away from the article.

The composition of the coating 22 is a significant feature of the present invention. This is because usage of an article by humans exposes the label to frequent contact with perspiration (which is acidic), abrasion, moisture, and variations in temPerature. In general, the coating 22 must be capable of withstanding wear from frequent and prolonged usage of the article by humans, i.e., the coating must be sufficiently hard and durable so as to be able to withstand repeated usage extending over a year or more without separation of the tag 14 from the article to be labelled and without significant deterioration, abrasion, or yellowing of the coating 22. In addition, the coating 22 should be composed of a material which is biocompatible and not harmful or destructive to human tissue. As with the adhesive 14 used to affix the tag 14 to the article, the coating 22 must also be compatible with the material used to create to identifying indicia, so that it does not dissolve or render them illegible.

In a preferred form, the coating 22 is formed when a hardenable liquid is applied to the tag 14 and allowed to harden. The hardenable liquid may be an adhesive dissolved in a liquid solvent, such as a lacquer or a clear acrylic in solution. When the solvent evaporates, a hard, transparent, wear-resistant coating is left on the tag 14. Alternatively, the hardenable liquid may be a thermosetting resin which, with the addition of heat, also cures to a hard, transparent, wear-resistant coating.

Figure 7:
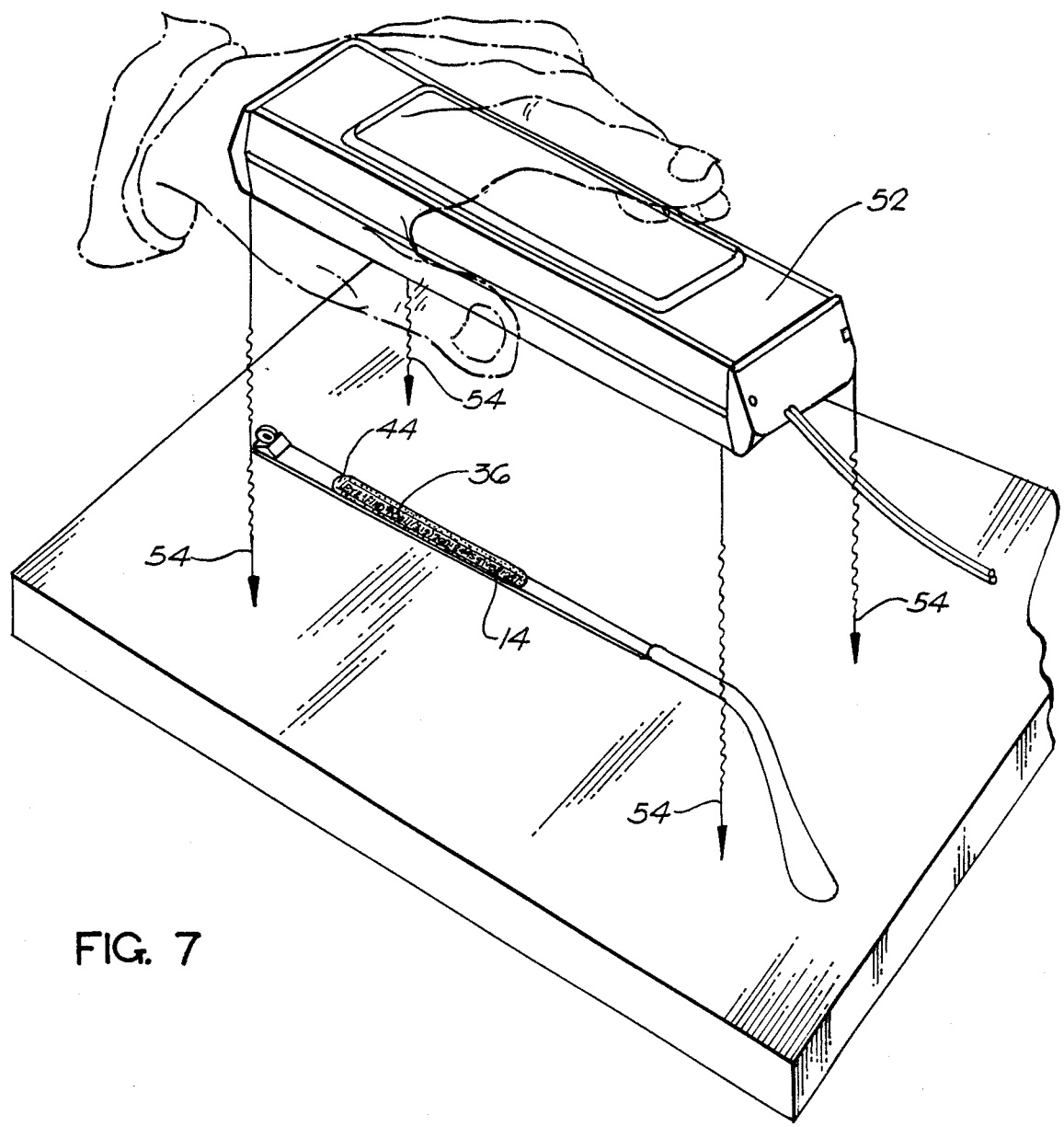
FIG. 7 is a front view of an additional step which may be used in practicing the method of the present invention.

Preferably, however, the coating 22 consists of a light-curing adhesive, which has been hardened or cured on exposure to light falling within a specified wavelength range and intensity. In particular, excellent results have been achieved with a polyurethane oligimer mixture manufactured by DYMAX® Engineering Adhesives, of Torrington, Conn., under the brand name "Light-Weld 181M⇌. This material cures to a hard, inflexible, abrasion-resistant, transparent, non-yellowing plastic upon exposure to long-wave ultraviolet light (i.e., light in the 300–350 nanometer range) at intensities of approximately 10,000 microwatts per square centimeter or greater. The cured material is capable of withstanding temperatures ranging from −65 to 300 degrees Fahrenheit. The "Shore" D hardness of the cured material is 85. Any conventional light source (either natural or artificial) capable of generating light of this intensity and falling within this wavelength range may be used to cure the adhesive. However, success has been achieved with a four-watt ultraviolet hand lamp manufactured by Spectronics Corporation of Westbury, N.Y. under the brand name SPECTROLINE® E-Series. As best shown in FIG. 7, after the tag 14 has been substantially covered with the polyurethane oligimer mixture, the hand lamp is placed over the tag 14 and energized for between one and three minutes so that the polyurethane oligimer mixture is exposed to the light and caused to harden or cure. Shorter hardening times may be achieved by using lamps of greater intensity.

Of course, it will be understood that other known polymeric mixtures which selectively harden or cure when exposed to light of intensities and wavelengths different than those recited above can also be used to form the coating 22 of the present invention.

One embodiment of the method of the present invention is depicted in FIGS. 4 through 7. The method shown involves application of the label of the present invention to the temple piece of a pair of eyeglasses. However, it will be understood that this method may be used with other portable articles worn or used by humans, including jewelry and the like, as described above.

In a step which is not shown in the drawings, label means are imprinted with identifying indicia visible to the naked eye. Preferably, a conventional laser-type printer is used to print the identifying indicia on a sheet of paper-backed flexible plastic material. Such a printer is capable of generating print that is sufficiently small, so that the label can be applied to smaller articles. However, other conventional means of printing or writing may be used, particularly with larger articles. Success has been had using as label means a sheet of material which consists of a layer of flexible polyester plastic (sold by DuPont under the brand name MYLAR®), which has been removably attached with a pressure-sensitive adhesive to a paper backing. However, other materials may be used as label means, such as adhesive-backed paper or other materials used in the printing trade.

Figure 4:
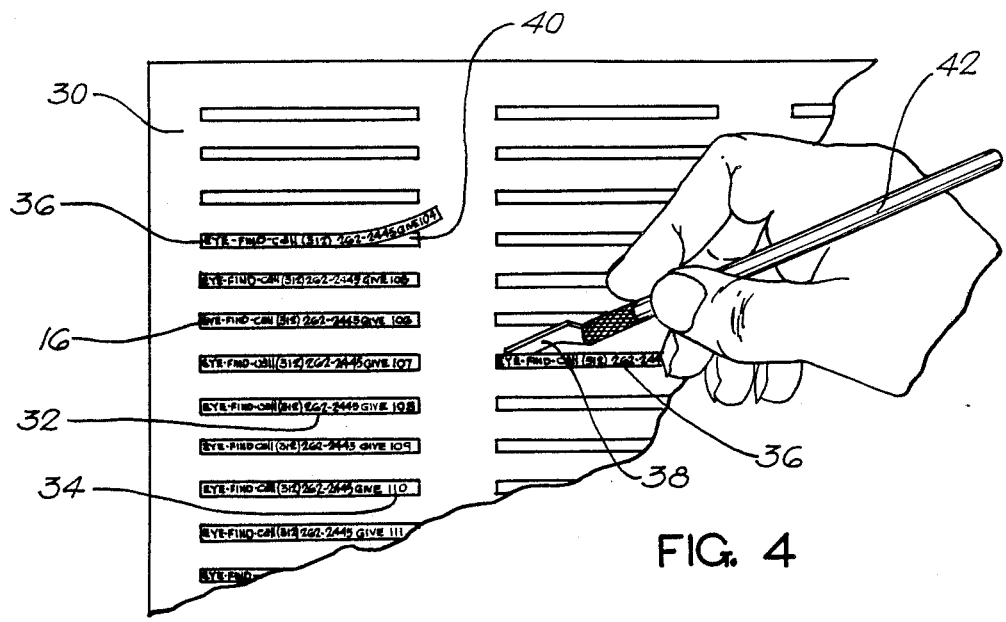
FIG. 4 is a front view of a sheet containing a plurality of identifying indicia, which may be used to make labels in accordance with the present invention.

As best seen in FIG. 4, a plurality of identifying indicia (indicated generally by the reference numeral 16) may be imprinted on a sheet 30 of paper-backed, flexible plastic material. The same types of identifying indicia described above may be imprinted on sheet 30 in practicing the method of the present invention. For example, the identifying indicia may be "customized" to include the name and telephone number of the owner of the article. The identifying indicia 16 may also include a first mark 32, which identifies the seller of the eyeglasses. In the embodiment depicted in FIG. 4, the first mark 32 consists of the telephone number of the person or entity selling the eyeglasses. However, other designations (e.g., an address) may be used. The identifying indicia also include a second mark 34, which may consist of a numeral identifying the person or entity to which the eyeglasses have been sold. It will be understood, however, that other like designations (e.g., alphabetical designations) may be used for the second mark 34.

It is particularly convenient if a plurality of identifying indicia (each of which is visible to the naked eye) are printed on the sheet 30, and when the second marks 34 include a sequence of numerals identifying the person or entity to which the eyeglasses have been sold. When this is done, the seller of the articles can assign numbers sequentially to the various persons purchasing eyeglasses, maintaining a record or log of these purchasers and their corresponding numbers. Alternatively, a computerized database can be used to store this information.

Referring again to FIG. 4, after the sheet 30 has been imprinted with identifying indicia 16, a flat tag is made by severing an area 36 of the sheet 30 from the paper backing 40 with blade 38 of knife 42. A straight edge or ruler (not shown) may be used as guidance in severing the area 36 from the sheet 30. The area 36 is then detached from the paper backing 40 to form the label means of the present invention. In detaching the area 36, it is helpful to insert the blade 38 under an edge of the severed area 36 so that the area 36 may be lifted away from the paper backing 40. However, the area 36 may also be removed by other means, such as with a pair of tweezers.

Figure 5:
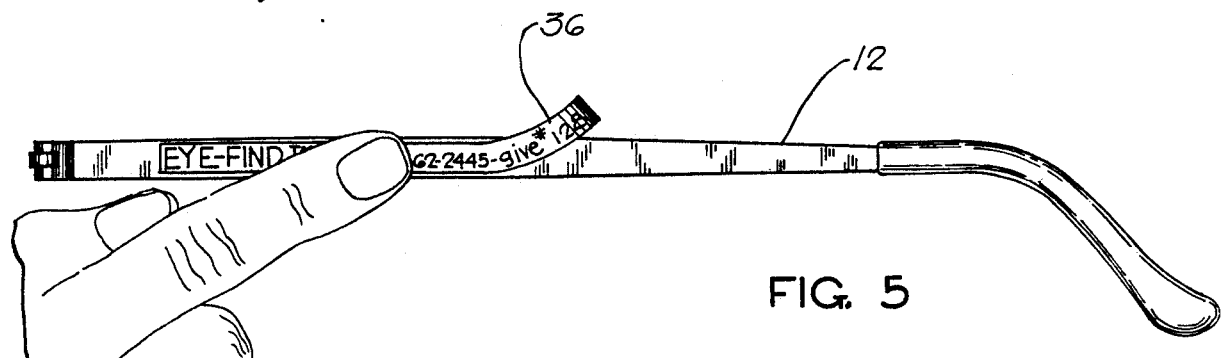
FIG. 5 is a front view of one of the steps which may be used in practicing the method of the present invention.

As best seen in FIG. 5, the severed area 36 is mounted on a surface of the article to be labelled, the surface of a temple piece 12 of a pair of eyeglasses. Since the severed area 36 was attached to the backing 40 (see FIG. 4) with a pressure-sensitive adhesive, if the severed area is transferred substantially rapidly to the surface of the temple piece 12, the adhesive will maintain its adhesive properties and be sufficient to affix the severed area 36 to the surface of the temple piece 12. In this regard, it is noted that strong adhesion between the severed area 36 and the surface of the temple piece 12 is not essential, so long as the severed area 36 is maintained in substantially the same position for application of the coating. This is because the coating (see below) helps to affix the severed area 36 to the surface of the article.

Figure 6A:
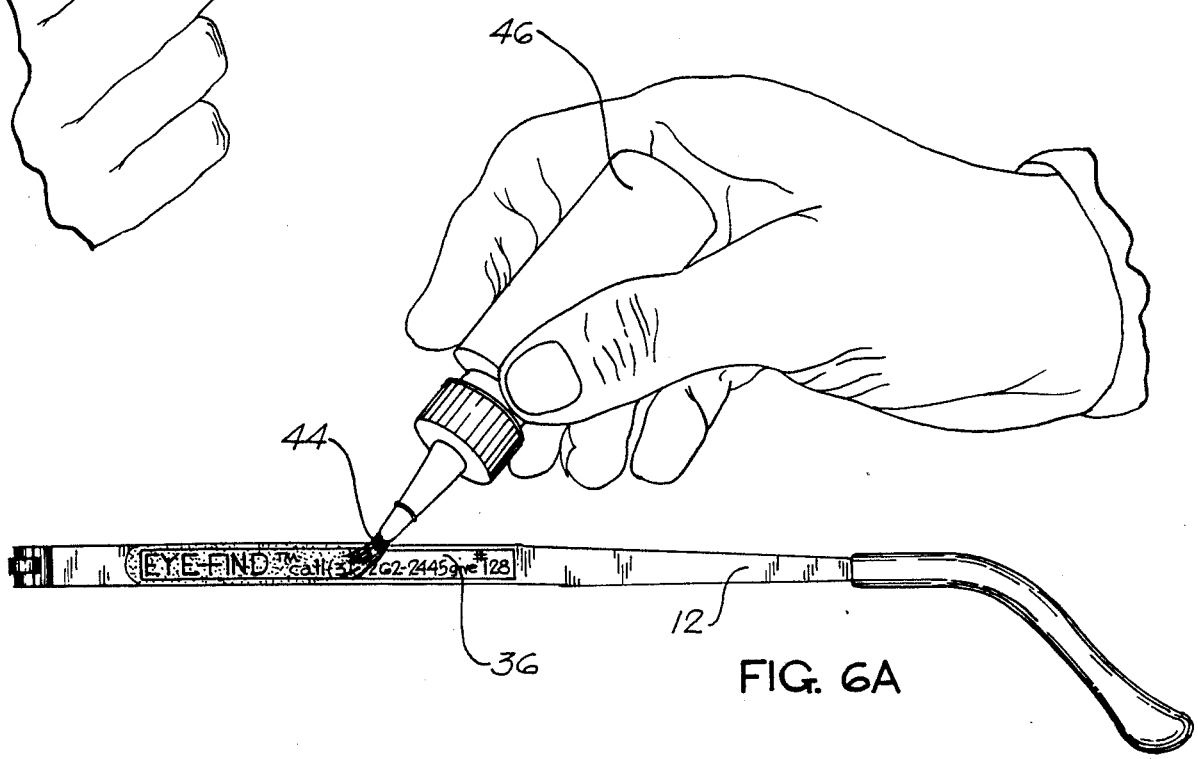
FIGS. 6A and 6B are front views of additional steps which may be used in practicing the method of the present invention.

As best seen in FIG. 6A, after the severed area 36 is mounted on or affixed to the surface of the temple piece 12, the severed area 36 is substantially covered with a transparent coating means in the form of a hardenable liquid. The hardenable liquid may be composed of any of the materials described above in connection with the detailed description of the identification label. As described above, the coating means is adapted to withstand wear from frequent and prolonged usage of the article by humans. Preferably, the hardenable liquid consists of a light-curing liquid adhesive capable of being selectively cured by exposure to light falling within a specified wavelength range and intensity. In this regard, the "Light-Weld 181 M" material described above is particularly suited for use in the present method. Referring again to FIG. 6A, the liquid adhesive 44 is dispensed from dispenser 46 by inverting and squeezing the dispenser 46.

Figure 6B:
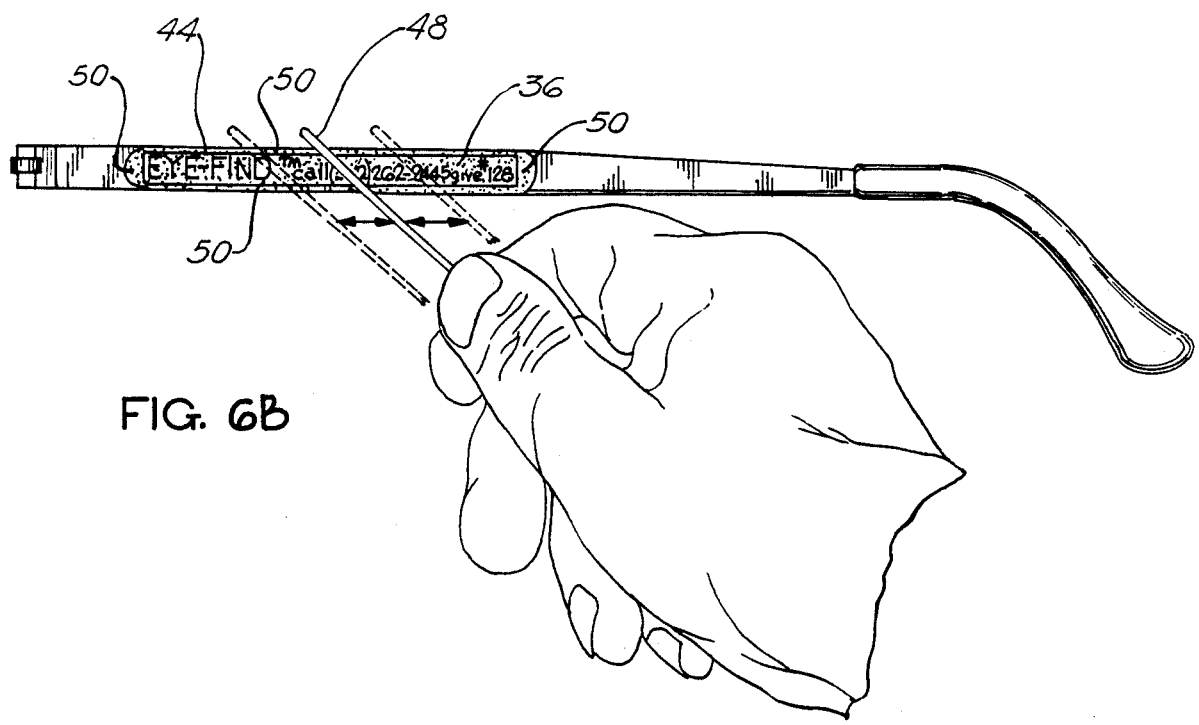

Referring now to FIG. 6B, after the liquid adhesive 44 is applied to the severed area 36 by dispensing it from dispenser 46, it is spread and smoothed with a blunt object, such as a toothpick 48. The toothpick 48 is moved back and forth in a lateral direction so that the adhesive 44 substantially covers the severed area 36. (The lateral movement of the toothpick 48 is depicted in FIG. 6B by showing the toothpick 48 in phantom at various positions during the smoothing step.) In addition, it is preferred that the adhesive 44 be spread beyond the edges of the severed area 36 so that the severed portion 36 is substantially coated with the adhesive 44 and substantially surrounded by a bead 50 of adhesive 44 which overlaps onto the temple piece 12. As noted above, this helps to prevent the severed area 36 from being peeled away from the temple piece 12 with prolonged usage of the article.

Referring now to FIG. 7, after the adhesive 44 has been dispensed and spread as described above, the adhesive 44 is allowed to cure or harden into a transparent coating capable of withstanding wear from frequent and prolonged usage of the article by humans exposing it to light falling within the specified wavelength range and intensity. For this purpose, the SPECTROLINE® hand lamp described above has been used with success. The hand lamp 52 is placed over the severed area 36, which has been coated with adhesive 44 by moving the hand lamp 52 downward in the direction of arrows 54. The hand lamp 52 is illuminated for between one and three minutes to harden or cure the adhesive 44 into a hard transparent coating capable of withstanding wear from prolonged usage of the eyeglasses by humans. Again, shorter cure times are made possible by using lamps having greater intensity.

Of course, it will be understood that the method descibed above may be used to make the labels of the present invention. Upon finding a lost article, such as a pair of eyeglasses, labelled in the manner described above, the finder may contact the seller of the article, and arrangements may be made for return to their rightful owner.

While the invention has been described in connection with a certain presently preferred embodiment, those skilled in the art will recognize many modifications to structure, arrangement, portions, elements, materials, components, and steps which can be used in the practice of the invention without departing from the principles thereof.

I claim:

1. An identification label for eyeglasses having a frame comprising:
    identifier means mounted on a surface of the frame of the eyeglasses, said identifier means being visible to the naked eye;
    a hard transparent coating means for protecting the identifier means from being separated from the surface of the eyeglasses, said coating means substantially covering the identifier means and being formed when a hardenable liquid is applied to the identifier means so as to substantially cover the identifier means and is allowed to harden to form a transparent coating capable of withstanding wear from prolonged usage of the eyeglasses.

2. The identification label of claim 1, in which the hardenable liquid is a light-curing adhesive, said adhesive being allowed to harden by exposure to light in a specified wavelength range.

3. The identification label of claim 2, in which the light-curing adhesive is selectively cured by exposure to long-wave ultraviolet light.

4. An identification label for labelling eyeglasses, which comprises:
    a substantially flat tag, said tag being mounted on the temple piece of the eyeglasses and containing identifying indicia visible to the naked eye;
    a hard transparent coating substantially covering the tag and overlapping onto portions of the temple piece adjacent to the tag to form a bead of coating surrounding the tag, said coating being formed when a light-curing adhesive is applied to the tag so as to substantially cover the tag, and cured by exposure to light in a specified wavelength range to form a transparent coating capable of withstanding wear from prolonged usage of the eyeglasses.

5. The identification label of claim 4, in which the light-curing adhesive is selectively cured by exposure to long-wave ultraviolet light.

* * * * *